United States Patent
Price et al.

(10) Patent No.: US 11,645,694 B2
(45) Date of Patent: *May 9, 2023

(54) METHODS AND SYSTEMS FOR PROVIDING PURCHASE RECOMMENDATIONS TO USERS

(71) Applicant: Capital One Services, LLC, McLean, VA (US)

(72) Inventors: Micah Price, Plano, TX (US); Qiaochu Tang, The Colony, TX (US); Geoffrey Dagley, McKinney, TX (US); Avid Ghamsari, Frisco, TX (US); Jason Hoover, Grapevine, TX (US); Staevan Duckworth, The Colony, TX (US); Stephen Michael Wylie, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,262

(22) Filed: Feb. 6, 2020

(65) Prior Publication Data
US 2020/0364768 A1    Nov. 19, 2020

Related U.S. Application Data

(63) Continuation of application No. 16/415,896, filed on May 17, 2019, now Pat. No. 10,592,961.

(51) Int. Cl.
*G06Q 30/06* (2012.01)
*G06Q 30/0601* (2023.01)

(52) U.S. Cl.
CPC ..... *G06Q 30/0631* (2013.01); *G06Q 30/0639* (2013.01)

(58) Field of Classification Search
CPC . G06Q 30/0631; G06Q 30/0639; G06Q 30/06
(Continued)

(56) References Cited

U.S. PATENT DOCUMENTS 6,236,990 B1    5/2001    Geller et al.
8,255,263 B2    8/2012    Smallwood
(Continued)

FOREIGN PATENT DOCUMENTS

WO    1998002835 A1    1/1998

OTHER PUBLICATIONS

Choi, S. H., Kang, S., & Jeon, Y. J. (Oct. 17, 2005). Personalized recommendation system based on product specification values. Expert Systems with Applications. Retrieved Dec. 20, 2022, from https://www.sciencedirect.com/science/article/pii/S0957417405002733.*

(Continued)

*Primary Examiner* — Jeffrey A. Smith
*Assistant Examiner* — Jennifer V Lee
(74) *Attorney, Agent, or Firm* — Bookoff McAndrews, PLLC

(57) ABSTRACT

Systems and methods are disclosed for providing purchase recommendations. According to some examples, a method may include: determining a set of vehicle characteristics represented in a candidate set of vehicles; for each vehicle characteristic in the set of vehicle characteristics, determining a percentage of the candidate set possessing the respective vehicle characteristic; selecting, from the set of vehicle characteristics, a vehicle characteristic based on a proximity of the respectively determined percentage to 50%; transmitting, to a user device associated with a user, an inquiry for a user preference regarding the selected vehicle characteristic; receiving, from the user device, a response indicating the user preference regarding the selected vehicle charac- (Continued)

teristic; excluding vehicles from the candidate set based on the indicated user preference to obtain a reduced candidate set; and transmitting, to the user device, a recommendation of one or more vehicles from the reduced candidate set.

20 Claims, 8 Drawing Sheets

(58) Field of Classification Search
USPC .................................................. 705/26.7
See application file for complete search history.

(56) References Cited

U.S. PATENT DOCUMENTS

| | | | |
|---|---|---|---|
| 8,620,891 B1 | 12/2013 | Thirumalai | |
| 10,068,284 B1 | 9/2018 | Zisk et al. | |
| 2002/0004764 A1* | 1/2002 | Stolze | G06Q 30/02 |
| | | | 705/26.8 |
| 2007/0192166 A1 | 8/2007 | Van Luchene | |
| 2007/0198470 A1* | 8/2007 | Freedman | G06Q 30/02 |
| 2010/0299190 A1* | 11/2010 | Pratt | G06Q 30/0282 |
| | | | 705/14.4 |
| 2011/0106746 A1* | 5/2011 | Ventilla | H04L 12/66 |
| | | | 706/50 |
| 2013/0282704 A1* | 10/2013 | Pantel | G06F 16/2425 |
| | | | 707/723 |
| 2014/0282704 A1* | 9/2014 | Tumuluru | H04N 21/814 |
| | | | 725/33 |
| 2015/0026155 A1* | 1/2015 | Martin | G06Q 30/06 |
| | | | 707/722 |
| 2015/0170238 A1* | 6/2015 | O'Malley | G06Q 30/0611 |
| | | | 705/26.4 |
| 2016/0048897 A1* | 2/2016 | Somaiya | G06F 16/2455 |
| | | | 705/26.3 |
| 2017/0279747 A1 | 9/2017 | Melzer et al. | |
| 2017/0295119 A1* | 10/2017 | Rosenberg | H04L 51/046 |
| 2018/0012280 A1* | 1/2018 | Eshun | G06Q 30/0625 |
| 2018/0332167 A1 | 11/2018 | Lu et al. | |
| 2019/0012390 A1 | 1/2019 | Nishant et al. | |
| 2019/0079996 A1 | 3/2019 | Mochel et al. | |
| 2019/0236186 A1* | 8/2019 | Kritika | G06Q 30/02 |
| 2019/0294714 A1* | 9/2019 | Guy Gerson-Golan | |
| | | | G06F 16/24539 |

OTHER PUBLICATIONS

Kim, L. (May 23, 2018). 9 Great Examples of How Brands are Using Chatbots, Retrieved from https://www.socialmediatoday.com/news/9-great-examples-of-how-brands-are-using-chatbots/524138/. (year:2018).

Capgemini (Jun. 20, 2018) Case study: Sephora's adoption of chatbots Retreived from https://linkedin.com/pulse/case-study-sephoras-adoption-chatbots-anupama-mishra. (Year: 2008).

* cited by examiner

METHODS AND SYSTEMS FOR PROVIDING PURCHASE RECOMMENDATIONS TO USERS

CROSS-REFERENCE TO RELATED APPLICATION(S)

This patent application is a continuation of, and claims the benefit of priority to, U.S. Nonprovisional patent application Ser. No. 16/415,896, filed on May 17, 2019, the entirety of which is incorporated herein by reference.

TECHNICAL FIELD

Various embodiments of the present disclosure relate generally to methods and systems for providing product recommendations to users and, more particularly, to artificial intelligence-based methods and systems for providing vehicle recommendations to users.

BACKGROUND

When shopping online, consumers may be presented with large lists of products to choose from. For example, when shopping for a vehicle at a website of an automobile dealer or an aggregator of inventory listings, a consumer may need to sort through large inventory lists to find vehicles with a desired set of characteristics. Furthermore, different websites may vary in the manner in which product inventories are presented. Therefore, a consumer may find certain online shopping interfaces to be difficult or cumbersome to use.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for providing product recommendations.

For instance, a method may include: determining a set of vehicle characteristics represented in a candidate set of vehicles; for each vehicle characteristic in the set of vehicle characteristics, determining a percentage of the candidate set possessing the respective vehicle characteristic; selecting, from the set of vehicle characteristics, a vehicle characteristic based on a proximity of the respectively determined percentage to 50%; transmitting, to a user device associated with a user, an inquiry for a user preference regarding the selected vehicle characteristic; receiving, from the user device, a response indicating the user preference regarding the selected vehicle characteristic; excluding vehicles from the candidate set based on the indicated user preference to obtain a reduced candidate set; and transmitting, to the user device, a recommendation of one or more vehicles from the reduced candidate set.

Furthermore, a computer system may include a memory storing instructions and one or more processors configured to execute the instructions to perform operations. The operations may include: determining a set of vehicle characteristics represented in a candidate set of vehicles; performing one or more iterations of a preference identification process, including: for each vehicle characteristic in the set of vehicle characteristics, determining a percentage of a candidate set possessing the respective vehicle characteristic; selecting, from the set of vehicle characteristics, a vehicle characteristic based on proximity of the respectively determined percentage to 50%; transmitting, to a user device associated with a user, an inquiry for a user preference regarding the selected vehicle characteristic; receiving, from the user device, a response indicating the user preference regarding the selected vehicle characteristic; and based on the response, reducing a quantity of vehicles in the candidate set and/or adjusting the set of vehicle characteristics; and transmitting, to the user device, a recommendation of one or more vehicles from the candidate set.

Furthermore a computer system, for implementing an artificial-intelligence interactive agent for determining vehicle recommendations based on user interaction, may include: a memory storing instructions and a database of vehicles; and one or more processors configured to execute the instructions to perform operations. The operations may include: transmitting, to a user device, a request to indicate a type of vehicle desired by a user of the user device; receiving, from the user device, an indication of the type of vehicle desired by the user; determining a candidate set of vehicles, selected from vehicles described in the database, based on the type of vehicle desired; performing a plurality of iterations of a preference identification process including: for each vehicle characteristic in a set of vehicle characteristics, determining a percentage of the candidate set possessing the respective vehicle characteristic, selecting, from the set of vehicle characteristics, a vehicle characteristic for which the respectively determined percentage is closest to 50%, transmitting, to the user device, an inquiry for a user preference regarding the selected vehicle characteristic, receiving, from the user device, a response to the inquiry indicating the user preference regarding the selected vehicle characteristic, and based on the response to the inquiry, reducing a quantity of vehicles in the candidate set and/or adjusting the set of vehicle characteristics, wherein the respective selected characteristic is different for each of the plurality of iterations of the preference identification process, and at least one of the plurality of iterations reduces the quantity of vehicles in the candidate set; and transmitting, to the user device, a web page including a list of one or more vehicles from the candidate set, the list having filters set in accordance with at least one user preference received in at least one of the one or more iterations of the preference identification process.

According to additional aspects of the disclosure, a non-transitory computer-readable medium stores instructions that, when executed by one or more processors, cause the one or more processors to perform the aforementioned computer-implemented method or the operations that the aforementioned computer systems are configured to perform.

Additional aspects and examples will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. Various embodiments of the present disclosure relate generally to methods and systems for providing product recommendations. As will be discussed in more detailed below, an interactive feature, such as a chatbot, may ask a user about whether he or she desires a certain product characteristic for purposes of shopping for a product. The product characteristic asked about in the question may be selected by a certain methodology such that a response from the user that is either a "yes" or "no" response would be expected to eliminate a relatively large percentage of products the user may choose from. Afterwards, the chatbot may optionally ask additional questions, each pertaining to a different product characteristic selected using the same methodology. By constructing the questions in such a manner, the number of questions needed for the chatbot to learn the product characteristics sought by the consumer may be minimized.

Figure 1:
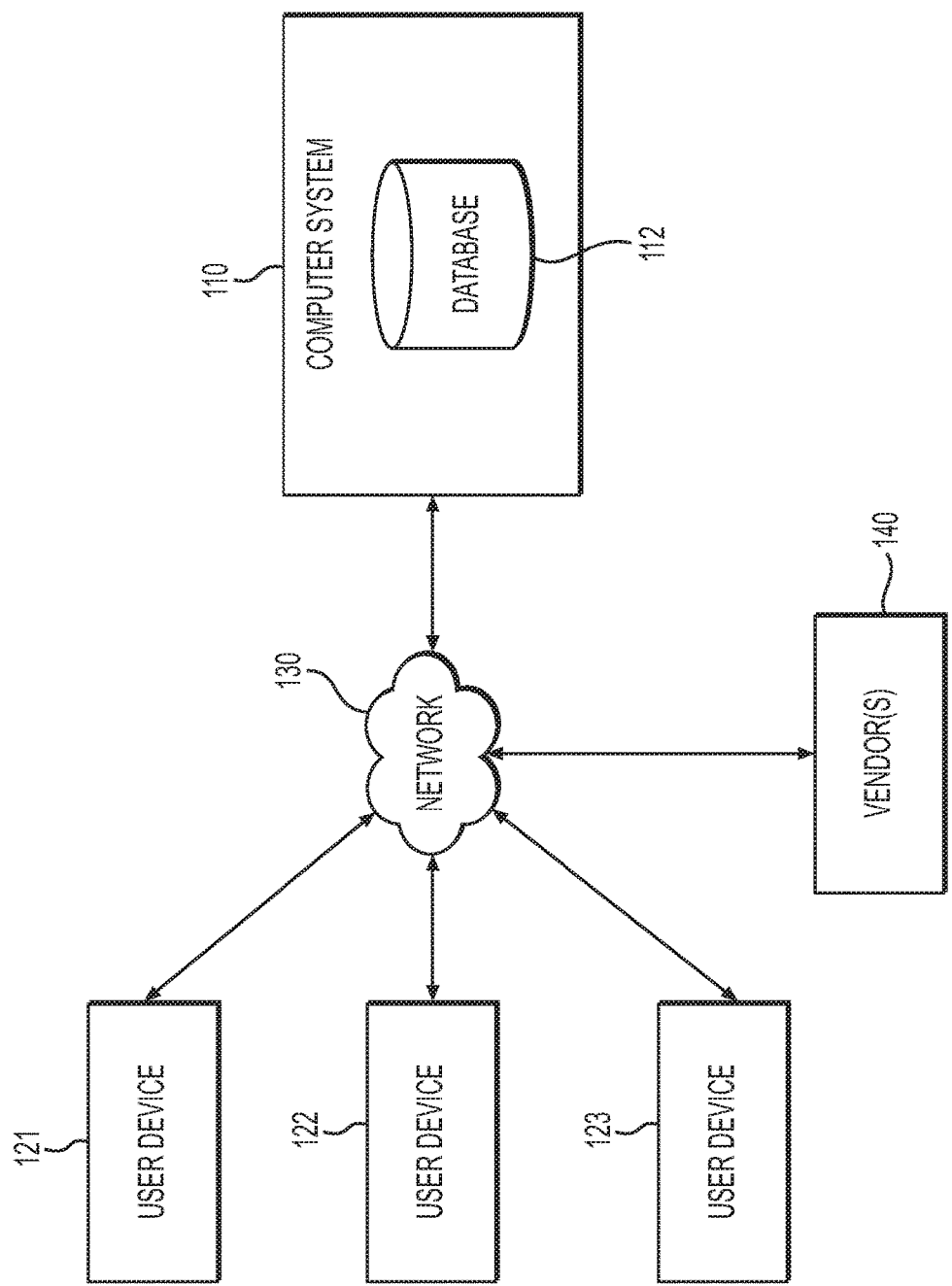
FIG. 1 depicts an exemplary system infrastructure in which a computer system for providing vehicle purchase recommendations may be implemented, according to one or more embodiments.

FIG. 1 shows an exemplary system infrastructure in which a computer system for providing vehicle purchase recommendations may be implemented. The environment may include a computer system 110 connected to a plurality of user devices 121, 122, and 123 over a network 130. The computer system 110 may also be connected to computer systems of one or more vendors 140 through network 130. The network 130 may be a public network (e.g., the internet), a private network (e.g., a network within an organization), or a combination of public and private networks. The user devices 121, 122, and 123 may each be a computing device, such as a laptop or desktop computer, or a mobile computing device such as a smartphone or tablet.

The computer system 110 may have one or more processors configured to perform various processes related to determining one or more product recommendations for a user, as will be discussed in more detail below. In some embodiments, computer system 110 may be a server system, in which case the user devices 121, 122, and 123 may be referred to as client devices that use a service provided by the computer system 110. In such examples, the user devices 121, 122, and 123 may interact with the computer system 110 through an application installed on the user devices 121, 122, and 123, such as a web browser, a web browser extension, or a mobile app. In some examples, the computer system 110 may have a cloud computing platform with scalable resources for computations and/or data storage, and may run one or more application on the cloud computing platform to perform various computer-implementable processes described in this disclosure.

The one or more vendors 140 may each be a party that sells, leases, or otherwise supplies products to users of the user devices 121, 122, and 123. The computer system 110 may have access to inventory lists of products offered for sale sold by the one or more vendors 140. In some examples, the computer system 110 may aggregate inventory lists of multiple vendors 140 into an aggregated inventory list stored in database 112 of the computer system 110. The aggregated inventory list may include information pertaining to the products offered for sale or stocked by the vendors 140. Such information may include the values of one or more various attributes of the products.

The environment shown in FIG. 1 may be applied to the automotive retailing industry, in which case the products may be vehicles, and the vendors 140 may be any party that sells or supplies such vehicles, such as car dealers. The users of the user devices 121, 122, and 123 may include consumers such as individual persons seeking to buy automobiles. In some examples, computer system 110 may be operated by a party that assists users in purchasing a vehicle. For example, the computer system 110 may be operated by a lender that offers car loans to consumers and desires to assist borrowers in finding a vehicle. However, in general, the computer system 110 may be operated by any party that stores a list of products. In some examples, the computer system 110 may be operated by a vendor 140, in which case the list of products stored in database 112 may include only products sold by the vendor 140 operating the computer system 110.

As noted herein, the computer system 110 may collect information pertaining to vehicle inventories of one or more vendors 140, and store the information in database 112. In the context of the automotive retailing industry, such information may include the values of one or more various vehicle attributes. Examples of vehicle attributes include make, model, body style, exterior color, interior color, number of doors, the vehicle condition, engine type, transmission type, fuel type, drive type, mileage, price, year, certain features (e.g., type of seats, availability of backup camera, etc.), and fuel economy (e.g., a highway miles-per-gallon rating, a city miles-per-gallon rating, or a combined miles-per-gallon rating). As used herein, the term "attribute" refers to any specification that defines a property of an object such as a vehicle, and the term "attribute value" or "value" (of an attribute) refers to the specific data populating such an attribute. For example, different cars may be defined using the same attribute (e.g., exterior color) and have different values (e.g., blue) for that attribute. The same value (e.g., blue) may exist for different attributes (e.g., exterior color and interior color).

Certain attributes may be represented as categorical variables. For example, the attribute of vehicle condition may take on values that represent the categories of new vehicles and used vehicles. Other examples of attributes that may be represented as categorical variables include, but are not limited to: make; model; body style (whose value may represent, for example, convertible, coupe, hatchback, sedan, sports utility vehicle (SUV), truck, minivan, van, and/or wagon); exterior color; interior color; number of doors; engine type (whose values may represent, for example, 3 cylinders or less, 4 cylinders, 5 cylinders, 6 cylinders, 8 cylinders, 10 cylinders or more, and/or electric); transmission type; fuel type (whose values may represent, for example, diesel, electric flexible-fuel, gasoline, and hybrid); drive type; and attributes pertaining to car features (for example, if the car feature is whether the car has a backup camera or heated seats, the values may be yes or no). The value of categorical attributes may be stored in any format, including numerical or string representations. Additionally, the computer system 110, when assembling the list of vehicles to be stored in the database 112, may process information from the vendors 140 so that an attribute is assigned. For example, the computer system may assign a single value representing silver for different shades of silver used by different vehicle manufacturers. An attribute represented as a categorical variable may be referred to as a categorical attribute.

Certain attributes may be represented as a quantitative variable, which may be a continuous quantitative variable or a discrete quantitative variable. Examples of attributes that may be represented as quantitative variables include mileage, price, year, and fuel economy. A quantitative variable may have ordinal values that can be ordered from low to high. Thus, a group of values of a quantitative variable may be characterized by metrics such as a mean or median value. A quantitative variable may have any suitable number of decimal places, if any, or other discretization. For example, the variable of vehicle year may have discretized values such as 2018, 2019, and 2020, etc. An attribute represented as a quantitative variable may be referred to as a quantitative attribute. It is noted that certain attributes may be represented as either a quantitative variable or categorical variable, and the representation of such attributes may depend on the desired implementation.

Table 1 below shows an example of a set of vehicles stored in the database 112. For purposes of illustration, Table 1 shows a set of 15 vehicles, along with their corresponding attribute values for make, model, condition, year, body type, and color. The list of vehicles stored in the database 112 may be indicative of any number of vehicles and in some arrangements, may be on the order of hundreds, tens of thousands, or higher. The number of attributes may depend on the implementation, and may be, for example, be 5 or more, 10 or more, 20 or more, 50 or more, 100 or more.

TABLE 1

| Vehicle ID | Make | Model | Condition | Year | Body Type | Exterior Color | Interior Color |
|---|---|---|---|---|---|---|---|
| 1 | Honda | Accord | Used | 2007 | Sedan | Silver | Gray |
| 2 | Honda | Accord | Used | 2012 | Sedan | Blue | Gray |
| 3 | Honda | Accord | Used | 2012 | Sedan | White | Gray |
| 4 | Honda | Accord | New | 2018 | Sedan | Silver | Gray |
| 5 | Honda | CR-V | Used | 2016 | SUV | Silver | Gray |
| 6 | Honda | CR-V | New | 2018 | SUV | Silver | Gray |
| 7 | Nissan | Rogue | New | 2018 | SUV | Blue | Gray |
| 8 | Kia | Sorento | Used | 2010 | SUV | Blue | Gray |
| 9 | Kia | Sorento | Used | 2010 | SUV | Blue | Gray |
| 10 | Kia | Sorento | Used | 2011 | SUV | White | Gray |
| 11 | Toyota | Prius | Used | 2007 | Hatchback | Blue | Gray |
| 12 | Toyota | Prius | Used | 2007 | Hatchback | Silver | Gray |
| 13 | Toyota | Prius | Used | 2009 | Hatchback | Blue | Gray |
| 14 | Toyota | Prius | Used | 2010 | Hatchback | Blue | Gray |
| 15 | Toyota | Prius | Used | 2013 | Hatchback | Blue | Black |

For each vehicle entry, the database 112 may store a respective value as a vehicle identifier (e.g., the "vehicle ID" field shown in Table 1), along with the values any number of attributes, such as the attributes described above. The entry for each vehicle may include other information, such as a vendor identifier corresponding to the vendor that is offering the vehicle, a vendor venue identifier corresponding to a venue at which the vehicle is currently located, and/or an identifier-specific identifier such as VIN (Vehicle Identification Number). For each vehicle, the computer system 110 may be configured to determine the location at which the vehicle is being offered based on the vendor identifier and/or the vendor venue identifier (if a vendor has multiple venues), or another attribute indicating location.

Figure 2:
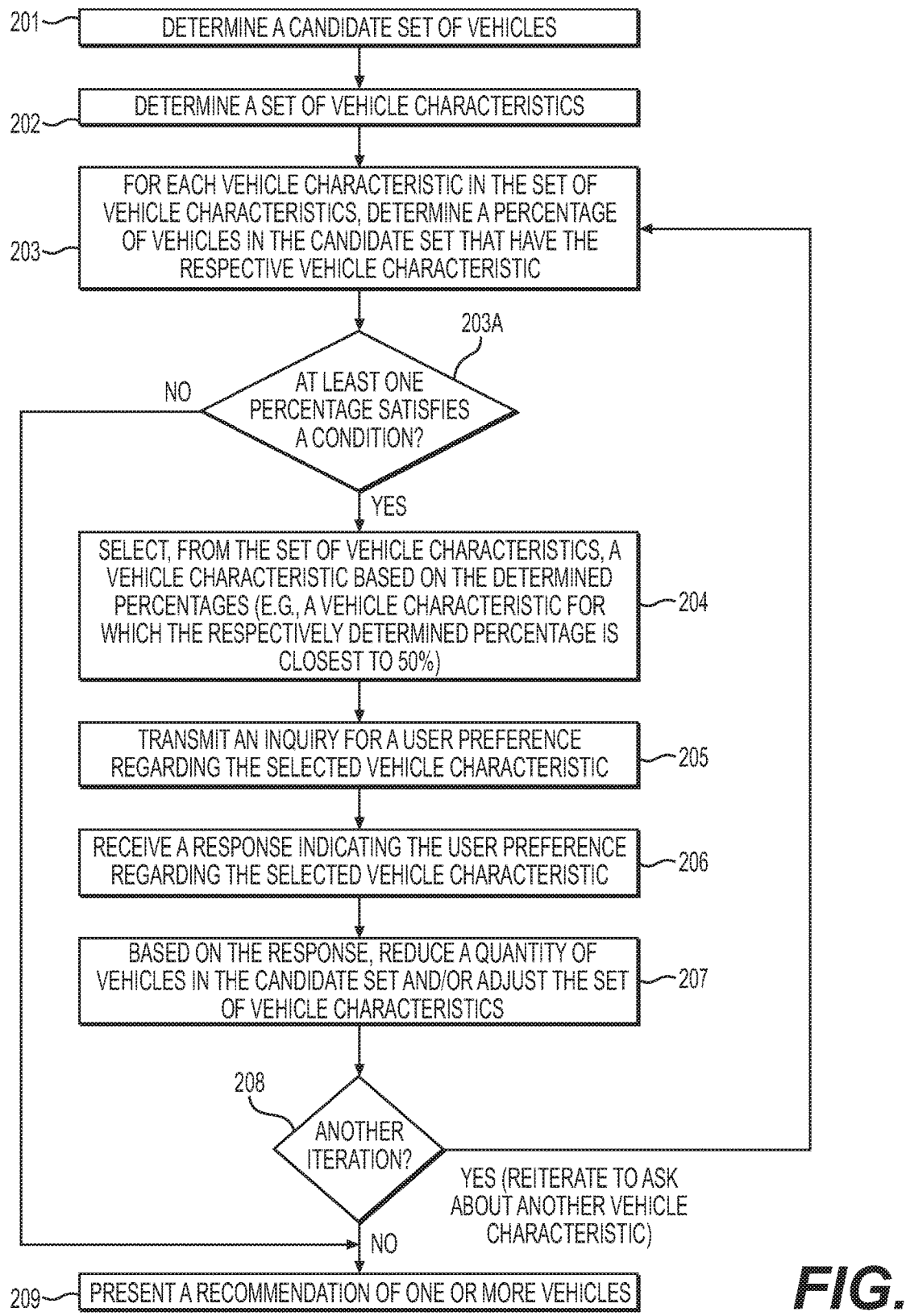
FIGS. 2-3 depict a method for providing vehicle recommendations to users, according to one or more embodiments.

FIG. 2 depicts a process for determining one or more vehicle recommendations based on automated user interaction, according to one or more embodiments of this disclosure. The method may be performed by computer system 110. In some examples, the method may be performed as part of a user-interaction service for recommending vehicles, such as a service that uses an artificial intelligence agent to interact with a user. Steps 203-206 may be referred to as a user preference identification process, and may be performed one time or reiterated a plurality of times.

Step 201 may include determining a candidate set of vehicles. The candidate set of vehicles may be a subset of a base set of all vehicles stored in database 112. In some examples, the candidate set is selected based on user geography. For example, the computer system 110 may have aggregated information on vehicles over multiple geographical regions into a base set of vehicles. Therefore, in order to provide a vehicle recommendation for a particular user, the computer system 110 may first determine the location of the user, and select the candidate set of vehicles as vehicles, selected from the base set, that are located at a venue within a certain geographical distance from the user. The location may be determined based on, for example, a user input transmitted from a device (e.g., user device 121) of the user to the computer system 110, an internet protocol address of the user device 121, or some other information available to the computer system 110. The geographical distance may be input by the user or have a default value adjustable by the user.

Figure 5A:
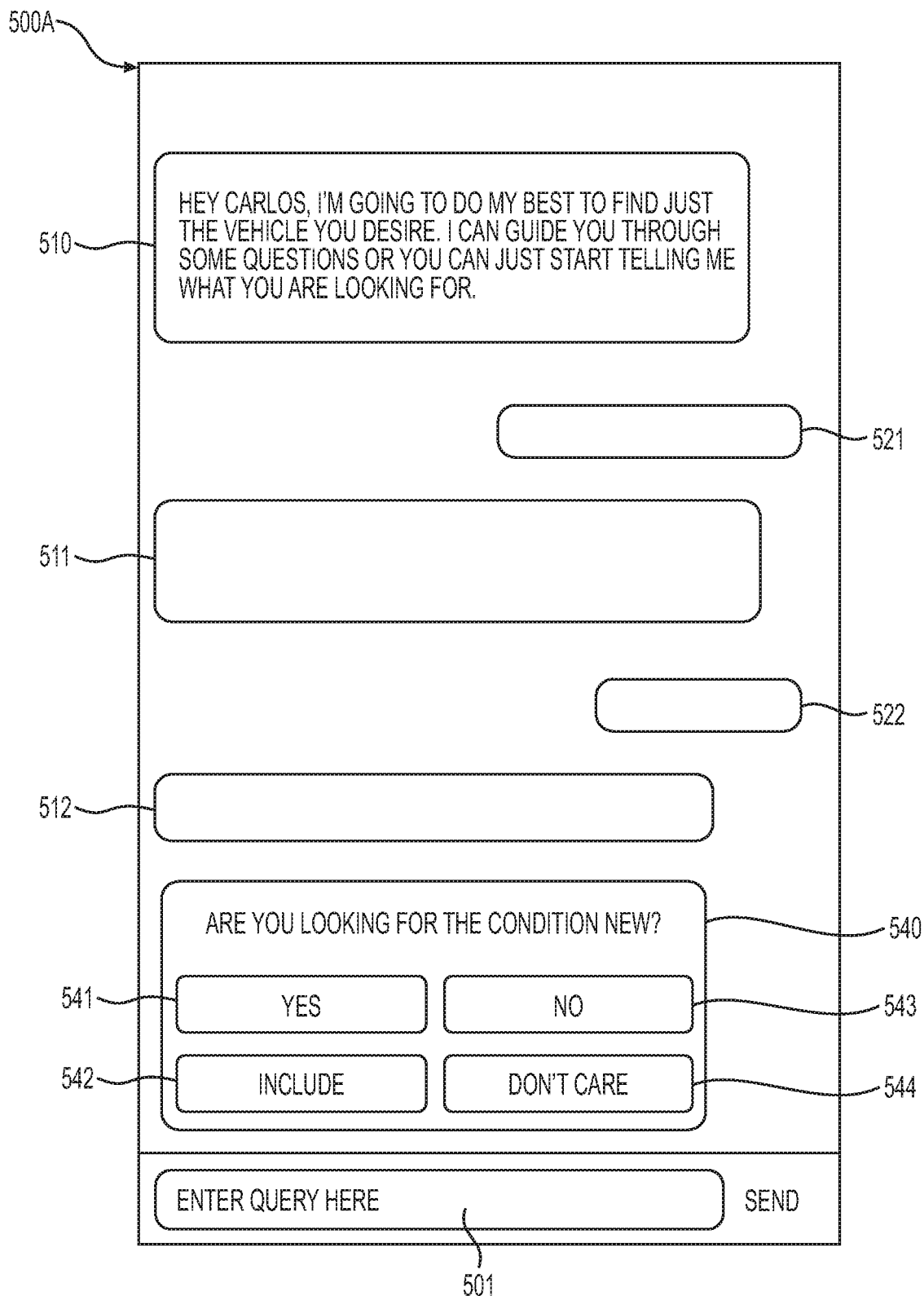
FIGS. 5A-5B depict examples of chatbot sessions, according to one or more embodiments.
Figure 5B:
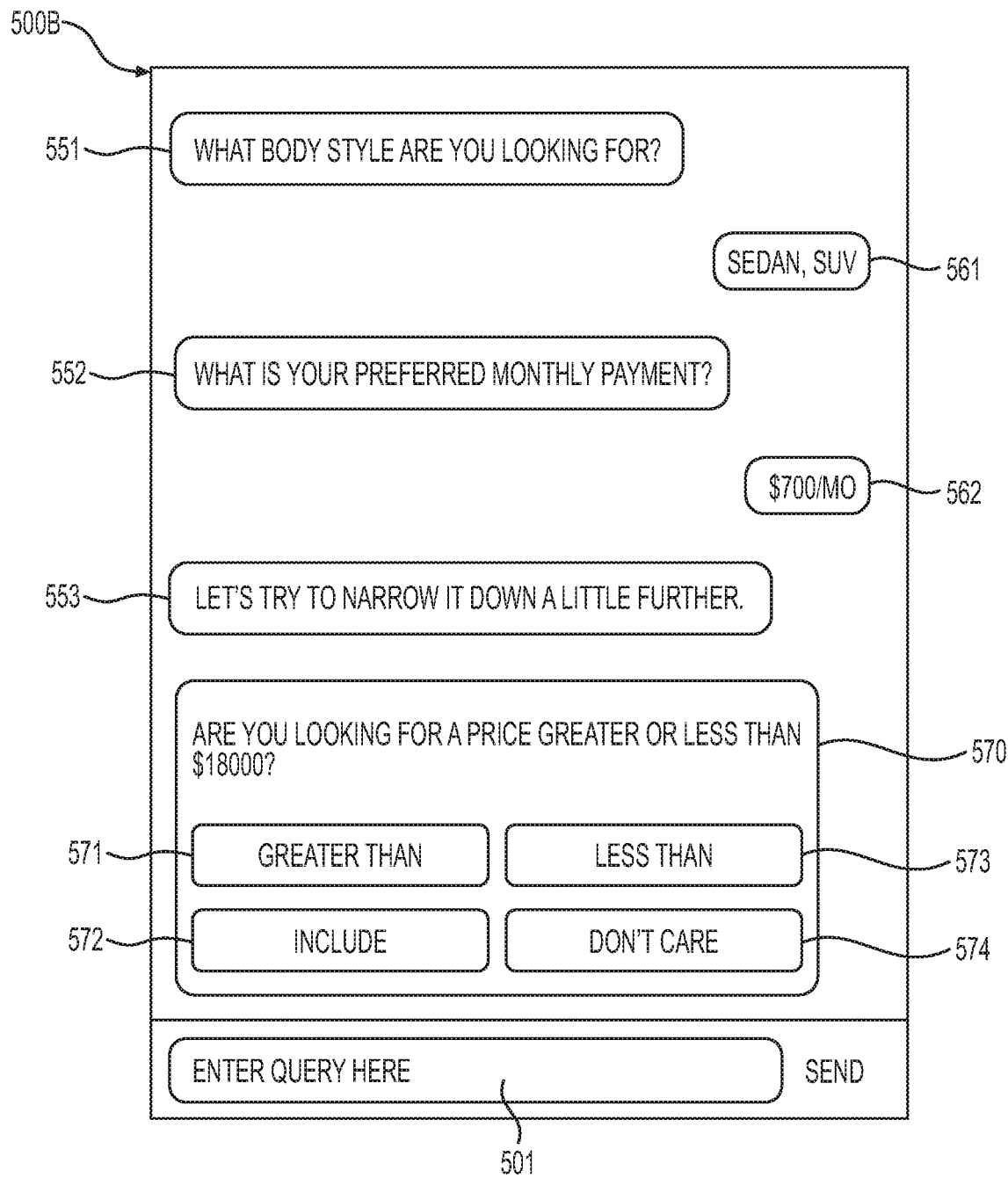

The candidate set of vehicles may also be based on user interactions. For example, the computer system 110 may transmit a series of preliminary questions to user device 121 to ask about preferences. The user's response may then be used to select the candidate set of vehicles in step 201. For example, if the preliminary questions asks a user about a desired vehicle make, and the user responds with a certain vehicle make, then the computer system 110 may narrow the base set to vehicles, within a certain geographical distance from the user, that are of the indicated make. The use of preliminary questions in such a manner is illustrated in FIGS. 5A and 5B, which are discussed in greater detail below.

Step 202 may include determining a set of vehicle characteristics. The set of vehicle characteristics may be characteristics that are possessed by at least one vehicle in the candidate set of vehicles determined in step 201. In this context, a characteristic may specify an attribute value for a particular attribute. For example, an exterior color of blue is a characteristic defined by the attribute "exterior color" and the value "blue." In the following discussion, the attribute is generally stated in combination with the attribute value if the attribute is not specifically discernable from the attribute value alone. A characteristic may have multiple attribute values for a single attribute (e.g., blue or silver exterior color) or multiple attribute values across multiple attributes (e.g., blue exterior color or SUV).

For quantitative attributes, a characteristic may be a range of values that is greater than, greater than or equal to, less than, and/or less than or equal to certain value(s) defining the range. A value defining a range may be, for example, a percentile threshold value of the data set for the variable in question, and may serve as an endpoint of the range. Value(s) defining a range may be, for example, a single value defining an endpoint of an open-ended range, or two values defining two endpoints.

For example, quantitative attributes may be split in half based on the median value of the data set, in which case a range of greater than or equal to the median value may be a characteristic. For example, "2011 or newer" may be a characteristic for the quantitative attribute of vehicle year. As another example, the values of a quantitative attribute may be grouped into bins (which may also be referred to as "buckets"), in which case a single bin or a union of multiple bins may be considered to be a characteristic. The creation of bins for a quantitative variable may be based on percentile thresholds values, such as the median value, quartile thresholds, and decile thresholds. It is also possible for the values to be grouped into predefined bins. Additionally, bins do not need to be equal in numerical range. As another example, the values of a quantitative attribute may be grouped into ranges that overlap, such as ranges of greater than or equal to the 25th percentile value, greater than or equal to the median, and greater than or equal to the 75th percentile value. In such an example, each of the three ranges may be a characteristic. The manner in which characteristics are defined from quantitative attributes may differ from one attribute to another.

For example, Table 1 lists values of 2007, 2012, 2012, 2018, 2016, 2018, 2018, 2010, 2010, 2011, 2007, 2007, 2009, 2010, 2013 for the vehicle year attribute. For this set of values, the median is 2011. Therefore, the computer system 110 may construct a vehicle characteristic that is a range of years greater than 2011, a range of years greater than or equal to 2011, a range of years less than 2011, or a range of years less than or equal to 2011. The selection of whether to use "greater than", "greater than or equal to", "less than", and/or "less than or equal to" with respect to the percentile threshold value to define a characteristic may depend on the specifics of the implementation. When a range represents a set of values, the complement of that range may be disregarded. For example, if "newer than 2011" is used as a characteristic, then "2010 or older" may be disregarded so as to be not included in the set of characteristics determined in step 202.

As mentioned above, the set of vehicle characteristics determined in step 202 may be characteristics represented in the candidate set of vehicles. For example, if the set of vehicles in Table 1 is taken as the candidate set of vehicles then the characteristics represented in that set may include: Honda, Nissan, Kia, Toyota, Accord, CR-V, Rogue, Used (condition), New (condition), newer than 2007, newer than 2011, newer than 2016, Sedan, Hatchback, SUV, Silver (exterior color), Blue (exterior color), White (exterior color), Gray (interior color), and Black (interior color). In this example the quantitative attribute of "year" is divided into bins that are based on the median as well as 25th and 75th percentile values and defined using the term "greater than."

In variations of the above example, the set of vehicle characteristics may additionally include two or more of the foregoing characteristics in the alternative. For example, "blue or white exterior color" may be a characteristic included in the set of vehicle characteristics.

In general, the set of vehicle characteristics determined in step 202 may include every combination of attribute and attribute value. However, depending on the desired implementation, step 202 may be performed by, for example, selecting only vehicle characteristics that are defined by only a single value of only a single attribute. Selection of characteristics may furthermore be limited to certain attributes.

Step 203 may include, for each vehicle characteristic in the set of vehicle characteristics, determining a percentage of the candidate set of vehicles that possess the respective vehicle characteristic. The candidate set may be the candidate set of vehicles as determined in step 201 during the first iteration of steps 203 through 207. In subsequent iterations of steps 203 through 207, the candidate set may have been adjusted during step 207 of the previous iteration.

For example, using the example set discussed above, the percentages may be calculated as shown in Table 2 below. In Table 2, "Count" and "Percentage" respectively indicate the number and percentage of vehicles in Table 1 having the given characteristic. In the example of Table 2, the "year" attribute is divided into bins based on quartiles.

TABLE 2

| Characteristic | Count | Percentage |
| --- | --- | --- |
| Honda | 6 | 40.0% |
| Nissan | 3 | 20.0% |
| Kia | 1 | 6.7% |
| Toyota | 5 | 33.3% |
| Accord | 4 | 26.7% |
| CR-V | 2 | 13.3% |
| Rogue | 1 | 6.7% |
| Sorrento | 3 | 20.0% |
| Prius | 5 | 33.3% |
| Used (condition) | 3 | 20.0% |
| New (condition) | 12 | 80.0% |
| Newer than 2007 | 12 | 80.0% |
| Newer than 2011 | 8 | 53.3% |
| Newer than 2016 | 3 | 20.0% |
| Sedan | 4 | 26.7% |
| Hatchback | 5 | 33.3% |
| SUV | 6 | 40.0% |
| Silver (exterior color) | 5 | 33.3% |
| Blue (exterior color) | 8 | 53.3% |
| White (exterior color) | 2 | 13.3% |
| Gray (interior color) | 14 | 93.3% |
| Black (interior color) | 1 | 6.7% |

The method of FIG. 2 may include a step 203A of determining whether at least one percentage determined in step 203 satisfies a condition. The condition may be a threshold required to proceed to later steps of the method. For example, the threshold may be a range above and below 50% (for example, 40 to 60%, 30 to 70%, 20 to 80%, 10 to 90%, 5 to 95%, or 2 to 95%), in which case step 203A may determine whether any of the percentages calculated in step 203 is within this range.

If there is at least one characteristic satisfying the condition (step 203A: YES), then the method may proceed to the subsequent steps 204-205. As will be discussed in more detail below, in step 205, a question regarding a user preference may be asked for purposes of narrowing down the candidate set. On the other hand, if all percentages determined in step 203 are either too low or too high to be within the threshold range, the implication is that no meaningful question can be asked based on the vehicle characteristics for purposes of narrowing down the candidate set. Accordingly, in such a scenario, the remaining steps 204 through 207 may be skipped (step 203A: NO). Thus, step 203A may be used to ensure that there is a meaningful question to ask in the subsequent step 205.

Step 204 may include selecting from the set of vehicle characteristics, a vehicle characteristic based on the determined percentages. In some examples, the characteristic whose corresponding percentage is closest to 50% is selected. It is noted that as used herein, the term "closest" may refer to more than one item. For example, if two percentages are equally close to 50%, then either one of the two percentages may be referred to as the "closest" percentage if they are closer to 50% than all other percentages are to 50%.

If multiple characteristics are equally close to 50%, then the selection may be based on a priority system. For example, different attributes may be associated with a specified priority value, such that a characteristic of an attribute having a relatively high priority may be selected over a characteristic of an attribute having a relatively lower priority. The specified priority value may be set based on the relative importance of one attribute in comparison to another attribute or one attribute value in comparison to another attribute value. Priority may also be based on how the process is implemented or executed, such as the order in which different characteristics are evaluated or identified.

For example, in the example shown in Table 2 above, the characteristics of "newer than 2011" and "blue (exterior color)" both have the percentages that equally close to 50%. In this case, since two characteristics are tied at the same value, the selection of the characteristic may be based on a priority system. Assuming that the year has greater priority than exterior color, the characteristic of "newer than 2011" is selected.

It is also possible, in other examples, for the selection to be based on a combination of factors. For example, the selection may be based on a combination of factors that includes proximity to 50% along with one or more additional factors, such as: factors representing a priority among different attributes, different attribute values, or different types of attributes (e.g., categorical vs. quantitative); randomization factors; and limitations on how many times the same attribute may be selected. Furthermore, the one or more additional factors affecting selection may be different for different iterations of steps 203 through 207. It is noted that whenever an attribute is referred to as being selected in the context of step 204, the selection of the attribute may be implemented as the selection of any characteristic of that attribute. That is, the selection of any characteristic of an attribute in step 204 may be generally referred to as a selection of that attribute.

For example, the selection may be based on an absolute-value of the difference from 50% multiplied by a weight corresponding to the attribute, wherein each attribute is assigned a different weight to represent its priority. In such examples, a characteristic whose corresponding percentage is closer to 50% may tend be more likely to be selected than a characteristic whose corresponding percentage is farther from 50%, but proximity to 50% may be only one of multiple factors.

In some examples, the one or more additional factors may limit the selection of characteristics of quantitative attributes. The median of a quantitative attribute is, by definition, the 50th percentile value. Therefore, if a characteristic is defined by splitting a quantitative attribute with respect to the median, and this process of splitting the quantitative attribute with respect to the median is repeated through subsequent iterations (e.g., as a result of a "yes" or "no" response, as described below), then that attribute may tend to be repeatedly selected in subsequent iterations if the selection is based solely on closeness to 50%, especially if the quantitative attribute is a continuous variable having a large data set. Therefore, to avoid repeated selection of a quantitative attribute, each quantitative attribute may have a limit as to the number of times it may be selected. Additionally or alternatively, a limit may be placed on the total number of selections across all quantitative attributes, so as to limit how often a question is asked for quantitative attributes relative to categorical attributes. Additionally or alternatively, the selection process of step 204 may first determine whether to select a quantitative attribute or a qualitative attribute based on a selection method, and then limit the selection to characteristics of attributes that belong to one of those two types of attributes. The selection method for determining whether to select a quantitative attribute or a qualitative attribute may be based on set probabilities, such as a 60% probability for selection of a categorical attribute and a 40% probability for selection of a quantitative attribute for each iteration. Repeated selection of the same quantitative attribute may be avoided if new characteristic(s) for the attribute are not generated for subsequent iterations, such as if the values of the quantitative attribute are split into bins and no new bins are created upon each subsequent iteration of steps 203 through 207.

If it is desirable to resolve user preference of a particular attribute, the user may be repeatedly asked about that attribute in each subsequent iteration, until a certain number of questions for that attribute has been asked or the user preference has been resolved within a certain degree (e.g., predefined degree) of specificity. For example, if a certain attribute has been selected in one iteration, then step 204 may be performed in the next iteration such that the attribute is selected once again.

Step 206 may include receiving a response indicating the user preference regarding the selected vehicle characteristic. The user may, for example, input the response using the aforementioned user interface (e.g., a graphical and/or voice user interface, as described above) at the user device 121. Step 206 may include receiving a response indicating the user preference regarding the selected vehicle characteristic. The user may, for example, input the response using the aforementioned user interface (e.g., a graphical and/or voice user interface, as described above) at the user device 121.

In some examples, the computer system 110 may recognize binary responses to the question. The response from the user may, for example, indicate that the user preference is an exclusion of vehicles not having the selected vehicle characteristic. Such response may also be referred to as a "yes" response to the selected vehicle characteristic, and may result in exclusion of vehicles not having the selected vehicle characteristic from the candidate set.

The response from the user may also indicate that the user preference is an exclusion of vehicles having the selected vehicle characteristic. Such response may also be referred to as a "no" response to the selected vehicle characteristic, and may result in exclusion of vehicles having the selected vehicle characteristic from the candidate set, as discussed below.

In some examples, the computer system 110 may recognize responses other than the aforementioned "yes" and "no" responses. For example, the computer system 110 may also recognize a response indicating a non-exclusive inclusion of the selected vehicle characteristic for potential consideration later on. Such response may be referred to as an "include" response and, in some situations, may represent a user preference of "maybe" or "possibly" in regards to whether he or she is looking for a vehicle having the selected vehicle characteristic. The handling of "include" responses and other types of responses are discussed below in greater detail.

In some examples, the computer system 110 may also recognize a response indicating that the vehicle characteristic is not determinative, in the sense that the selected vehicle characteristic is not to be further used for narrowing down the candidate set. Such response may be referred to as a "don't care" response.

Step 207 may include, based on the response, reducing a quantity of vehicles in the candidate set and/or adjusting the set of vehicle characteristics. Step 207 is further illustrated in FIG. 3, wherein steps 301, 302A, 302B, 302C, and 302D may be considered to be sub steps of step 207 of FIG. 2.

Figure 3:
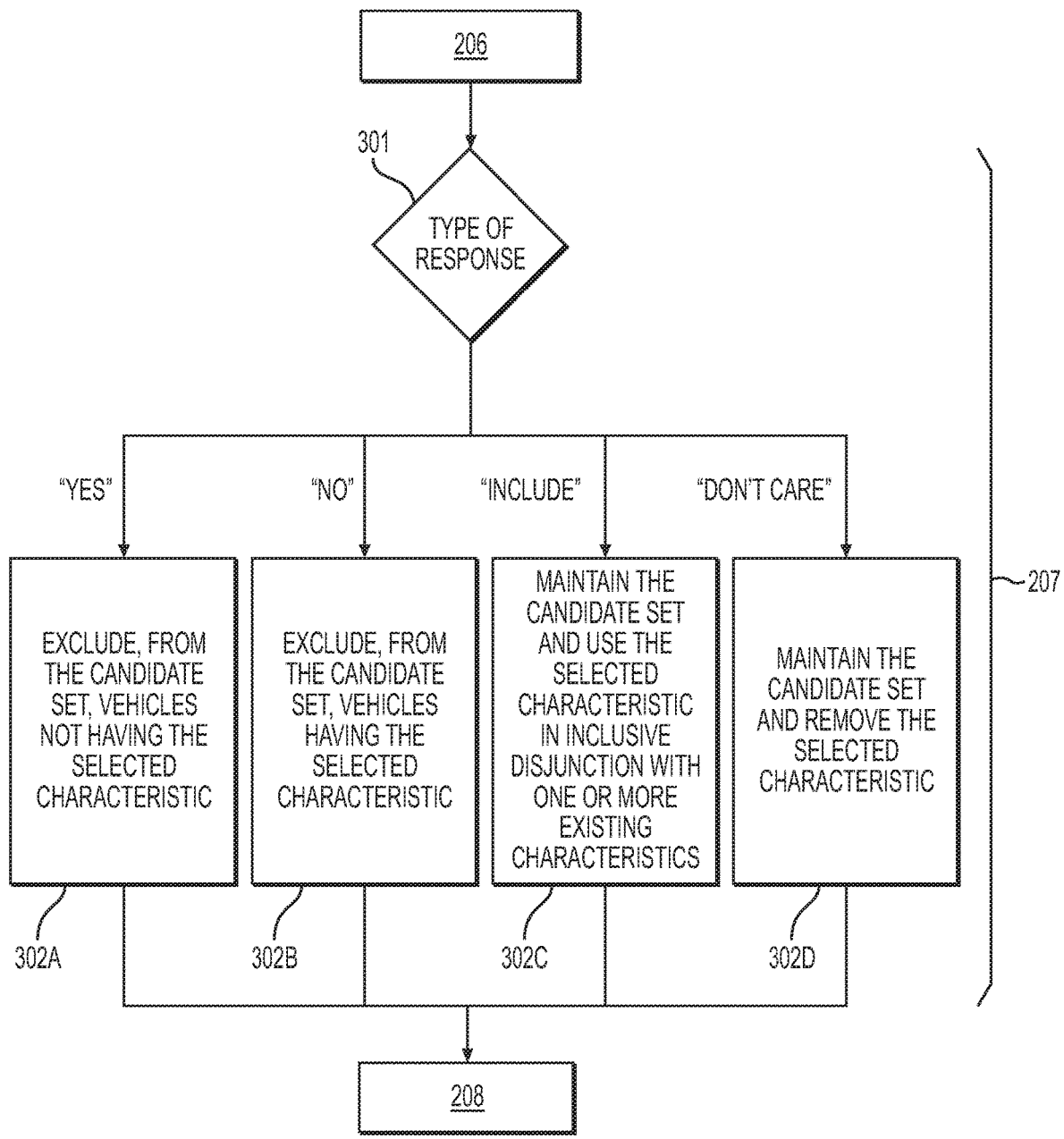

For example, turning to FIG. 3, in step 301, the computer system 110 determines the type of response received in step 206. If the response is a "yes" response, then the computer system 110 may adjust the candidate set by excluding, from the candidate set, vehicles that do not have the selected characteristic (step 302A). "Yes," "no," "include," and "don't care" responses may be of any format, so long as they are recognizable by the computer system 110. If the response is a text string, the determination of the type of response may involve computer algorithms to interpret the text string.

If the response is a "no" response, then the computer system 110 may adjust the candidate set by excluding, from the candidate set, vehicles that do have the selected characteristic (step 302B). That is, in both cases, the candidate set of vehicles is narrowed. Furthermore, in both cases, computer system 110 may optionally adjust the set of vehicle characteristics by removing the selected vehicle characteristic from the set of vehicle characteristics, but doing so is not required if the selected vehicle characteristic will not be selected in a subsequent iteration.

If the response is an "include" response, then the computer system 110 may maintain the candidate set without removal of any vehicles from the candidate set, and use the selected characteristic in inclusive disjunction with one or more existing characteristics in the set of vehicle characteristics other than the selected characteristic (step 302C). In using the selected characteristic in inclusive disjunction with an existing characteristic, the selected characteristic may be combined with the existing characteristic to form a new characteristic that is an inclusive disjunction of the selected characteristic and the existing characteristic. That is, this new characteristic may be satisfied by satisfaction of either one or both of the existing characteristic and the selected characteristic. A characteristic that is satisfied by satisfaction of any one of a plurality of characteristics may also be referred to as a set of alternate characteristics. Additionally, the selected characteristic, as well as each of the one or more existing characteristics in their forms prior to being inclusively disjoined with the selected characteristic, may be removed from the set of vehicle characteristics.

For example, in Table 2, the full set of vehicle characteristics includes a set of characteristics for the attribute of body type, which is {"Sedan", "Hatchback", "SUV"}. If the selected vehicle characteristic in step 204 is "SUV," then, after receiving an "include" response, the set of vehicle characteristics for the attribute of body type may be updated to {"Sedan or SUV", "Hatchback or SUV"}. The previous characteristics of "SUV", "Hatchback", and "Sedan" may be removed from the set of vehicle characteristics. It is noted that the term "or" is used herein to denote a characteristic that is satisfied by either characteristic, in the manner of an inclusive disjunction. For example, "Sedan or SUV" may be satisfied by a vehicle that is a sedan or a vehicle that is an SUV. The original characteristic of "SUV" (as a sole characteristic) may be replaced so as to be removed from the set of vehicle characteristics, to avoid a repeat of the same question. As another example, if the set of vehicle characteristics for the attribute of body type were {"Sedan", "Hatchback", "SUV", "Coupe"}, then an "include" response for "SUV" would result in this set being updated to {"Sedan or SUV", "Hatchback or SUV", "Coupe or SUV"}. As another example, if the full set of vehicle characteristics includes a set of vehicle characteristics for fuel economy, and the set of vehicle characteristics for fuel economy is {"MPG<20", "20≤MPG<25," "25≤MPG<30"}, and an "include" response is received for the characteristic of "MPG<20", then the set of vehicle characteristics for fuel economy may be updated to {"MPG<25", "MPG<20 or 25≤MPG<30"}.

In some examples, the "one or more existing characteristics" in step 302C may be all existing characteristics (other than the selected characteristic) that have the same attribute as that of the selected characteristic. In the above examples, the selected characteristic of "SUV," which is a body type characteristic, may be added to all other body type characteristics in the set of vehicle characteristics. However, it is also possible for the alternate characteristics to be of different attributes (e.g., "SUV or blue exterior color").

If the response is a "don't care" response, then the computer system 110 may maintain the candidate set of vehicles without removal of any vehicles from the candidate set, but adjust the set of vehicle characteristics by removing the selected vehicle characteristic from the set of vehicle characteristics (step 302D), so as to avoid a repeat of the same question. If the selected vehicle characteristic is part of a characteristic that is a set of alternate characteristics, then the selected vehicle characteristic may be removed from the set of alternate characteristics.

For example, if the set of characteristics is as listed in Table 2 and the selected vehicle characteristic in step 204 is "newer than 2011," then, after receiving a "don't care" response, the set of vehicle characteristics may be updated to omit "newer than 2011." Afterwards, in the next iteration, step 203 may be performed with the set shown in Table 2, but without the characteristic "newer than 2011." In this case, "blue (exterior color)" may be selected in the subsequent step 204, as the best characteristic among the remaining set of characteristics.

For quantitative attributes, it is also possible to generate new characteristic(s) for the attribute following each iteration if the size of the candidate set of vehicles is reduced according to step 207 of the completed iteration. The new characteristic(s) may be generated using any of the methodologies described above in relation to step 202. The new characteristic(s) may replace all existing characteristics of the attribute or be added in addition to the existing characteristics.

For example, if the data set of the attribute was split in half based on the median value to define a vehicle characteristic (as discussed above in relation to step 202), and the candidate set is decreased in size due to a response in step 206 (e.g., a "yes" or "no" response was received, resulting in vehicles being excluded from the candidate set in accordance with step 302A or 302B), then the remaining data set for that attribute, which is the data set for the reduced-size candidate, may be split again, based on the median value of the remaining data set, to define a new characteristic.

For example, the median year in the data set of Table 1 is 2011. If the data set for the year is split in half based on this median value so as to arrive at, for example, the characteristic of "newer than 2011," and a "no" response is received for this characteristic, then in the next iteration, the remaining data set would be vehicle IDs 1, 11, 12, 13, 8, 9, 14 and 10 (with years 2007, 2007, 2007, 2009, 2010, 2010, 2010, and 2011, respectively). The median of the remaining data set is 2009. Therefore, the set of vehicle characteristics may be adjusted to have the characteristic of "newer than 2009." The same process of redefining the characteristic for a quantitative attribute that is split based on the median may be performed if the response received is a "yes" response, or if the data set for that attribute was reduced as a result of an answer to a question for a different attribute. By doing so, a quantitative attribute that is split only based on the median value would not be exhausted from being selected again in the event of a "yes" or "no" response to a question directed to that attribute. As described above in relation to 204, it is possible to impose factors that avoid successive selection of the same quantitative attribute, if a quantitative attribute is split based on the median after each iteration. Referring back to FIG. 2, step 208 may include determining whether or not to perform another iteration of the preference identification process. For example, the computer system 110 may reiterate the preference identification process (208: YES) until a termination condition has been satisfied. The termination condition may be, for example, the completion of a predetermined number of total iterations, a quantity of vehicles remaining in the candidate set (after any exclusions made in accordance with the user response(s) have been applied), a percentage of vehicles remaining in the candidate set relative to the initial candidate set as determined in step 201 (after any exclusions made in accordance with the user response(s) have been applied), or a combination of conditions including one of the foregoing.

Therefore, steps 203A and 208 may collectively regulate the number of iterations of the user preference identification process of steps 203 through 207. It is noted that step 208 is not required. In some examples, step 208 may be omitted such that the process automatically reiterates until reiteration is stopped by step 203A. In other examples, step 203A may be omitted. Additionally, it is noted that steps 302C and 302D in FIG. 3 may be performed after step 208.

Step 209 may include presenting a recommendation of one or more vehicles. The recommendation may indicate or represent the candidate set as reduced in the prior steps or one or more vehicles from the candidate set. The computer system 110 may transmit the recommendation to the user device 121. In some examples, a list of one or more recommended vehicles or a portion of the list may be transmitted to the user device 121 for display on the user device (see FIG. 6). In other examples, the recommendation may indicate or represent the list of vehicles by being a hyperlink to a webpage that includes the list of one or more recommended vehicles, or a summary representation of the one or more recommended vehicles (such as a list of each unique combination of make and model represented in the one or more recommended vehicles).

Figure 4:
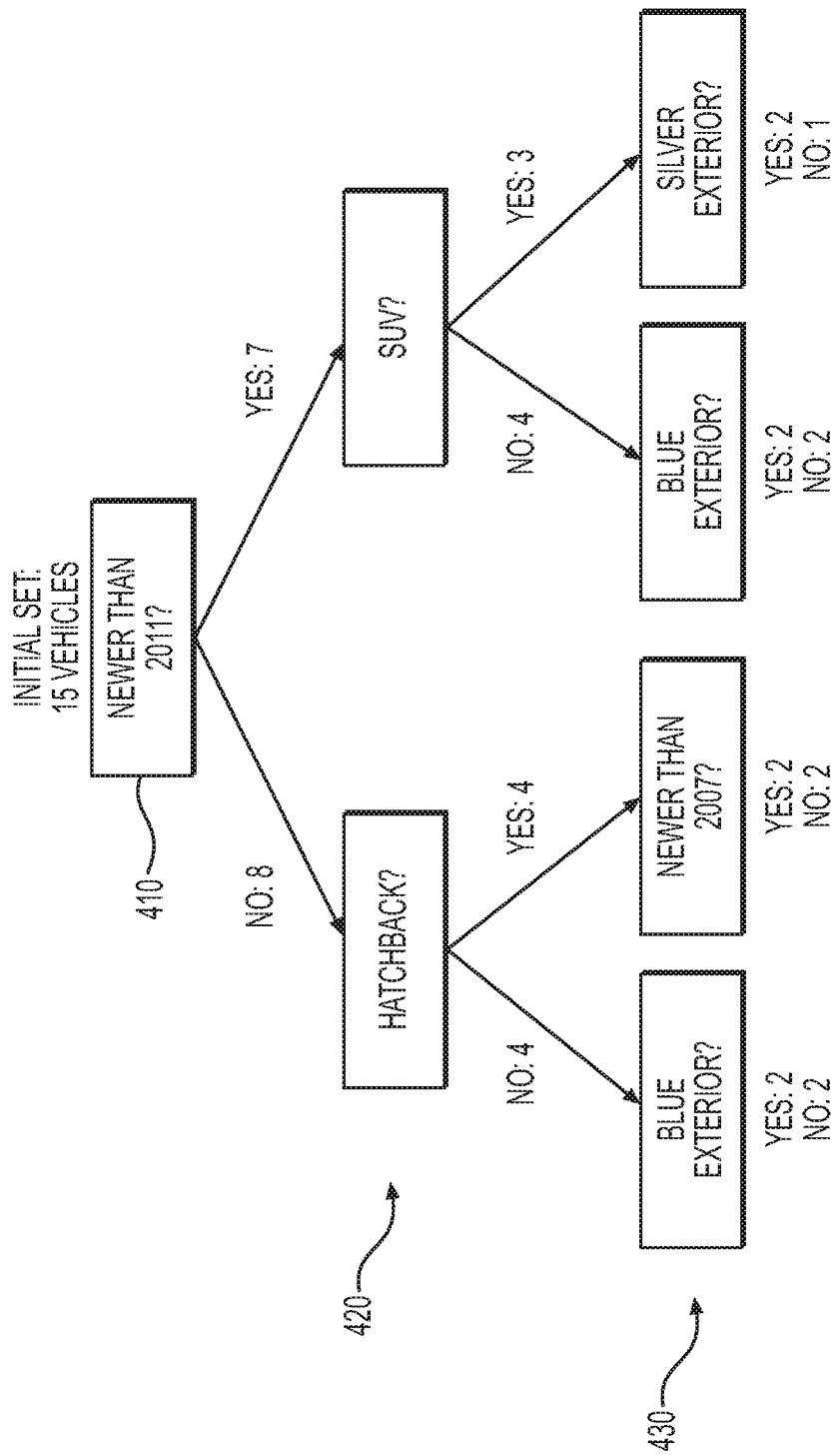
FIG. 4 illustrates a binary tree representing user interactions that may result from a certain set of vehicles, according to according to one or more embodiments.

FIG. 4 illustrates an example of a binary tree representing possible questions and answers resulting from the set of vehicles in Table 1, assuming that each response from the user is a "yes" or "no" response. The nodes 410, 420, and 430 of the binary tree correspond to the possible selected characteristics for the first, second, and third iterations of steps 203 through 207 for the candidate set of vehicles shown in Table 1.

As discussed above, in the first iteration, the characteristic that best splits the set of 15 vehicles in Table 1 is "newer than 2011," which is therefore presented to the user as a question. If the user answers "yes," then the set of vehicles in Table 1 is reduced to 7 vehicles (as indicated by "Yes:7" in FIG. 4), which are vehicles ID Nos. 2, 3, 4, 5, 6, 7 and 15. Among this reduced candidate set, the best characteristic to split the vehicles according to the methodology described for step 204 is "SUV," which is possessed by three of the vehicles (vehicle ID Nos. 5, 6, and 7), and not possessed by the other four.

As shown in FIG. 4, if the user answered with a "no" response to the first question (node 410), the next characteristic selected for inquiry is "Hatchback." If the user then answers with a "yes" response, then the next characteristic selected for inquiry is "newer than 2007." As shown, it is possible for the user to be asked more than one questions pertaining to the same attribute.

As shown in FIG. 4, each question requests an answer that would split the candidate set of vehicles in a manner that is closest to a 50-50 split, assuming that the answer is either a "yes" or "no" response. This is because each question asks about a characteristic that was identified (according to step 204) as having a corresponding percentage that is closest to 50%. By asking questions in such a manner, the average number of questions needed to reduce the candidate set of vehicles to an arbitrarily low quantity of vehicles may be minimized in the case that each question is answered with a "yes" or "no" response with equal probability.

Table 3 below illustrates an example of a series of user interactions that include responses other than "yes" and "no" responses. In this example, the initial candidate set of vehicles in the candidate set is 72633. As shown below, responses that are "yes" or "no" result in the reduction of the quantity of vehicles in the candidate set. A blank entry in the field for the number of vehicles indicates that the number of vehicles has not changed since the previous iteration. In Table 3, a characteristic that has been joined with another characteristic to form a set of alternate characteristics due to a previous "include" response is denoted by square brackets for purposes of annotation. In the example implementation depicted by Table 3, characteristics subjected to an "include" response are joined only with characteristics of the same attribute, and not with characteristics of a different attribute.

TABLE 3

| Iteration No. | Selected vehicle characteristic | Response | Number of vehicles remaining |
|---|---|---|---|
| 1 | Price > 2700 | Don't care | 72633 (unchanged from initial candidate set) |
| 2 | Drive type: Four-wheel drive | Include | |
| 3 | City MPG > 20 | Don't care | |
| 4 | Engine: 4-cylinder | include | |
| 5 | Heated seats: Yes | Yes | 41707 |
| 6 | Body style: SUV | Include | |
| 7 | Combined MPG > 21 | Don't care | |
| 8 | Condition: New | No | 24723 |
| 9 | Year > 2015 | Don't care | |
| 10 | Highway MPG > 25 | Don't care | |
| 11 | Engine: [4-cylinder] or 6-cylinder | Include | |
| 12 | Interior color: Black | Include | |
| 13 | Mileage > 30000 | Don't care | |
| 14 | Body style: [SUV] or Sedan | No | 13876 |
| 15 | Exterior color: Black | Include | |
| 16 | Drive type: [Four-wheel drive] or Rear-wheel drive | Yes | 5383 |
| 17 | Fuel type: Gasoline | No | 2397 |
| 18 | Engine: [4-cylinder] or [6-cylinder] or 8-cylinder | Yes | 1232 |
| 19 | Exterior color: [Black] or White | Yes | 623 |

Figure 6:
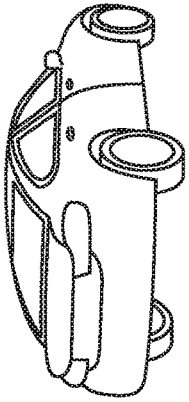
FIG. 6 depicts an example of an interface for presenting one or more vehicle recommendations, according to one or more embodiments.

FIGS. 5A, 5B, and 6 illustrate examples of user interactions with an artificial-intelligence interactive agent. The interactive agent may be a chatbot provided by a service of the computer system 110. The chatbot may have the ability to perform the method of FIGS. 2 and 3, among other functionalities. The chatbot may be programmed to interact with a user to help the user select find a vehicle to purchase or lease.

The respective screens 500A and 500B of FIGS. 5A and 5B may be displayed on a client application executed by a user device (e.g., user device 121). The client application may be a web browser, a web browser extension, a text-messaging application (e.g., SMS messaging application), or an application (e.g., mobile app) designed to interface with the chatbot. The client application may have a user interface 501 enabling the user to interact with the chatbot by inputting text queries.

The user or the chatbot may initiate a conversation session. In FIG. 5A, messages 510, 511, 521, and 522 may be part of a conversation between the chatbot and the user. For example, at the start of the session, the chatbot may present a message 510 that is a question asking the user whether he or she would like to be asked a series of questions or instead state what type of vehicle he or she desires. The user may respond with a message prompting the chatbot to output message 511, which may be a preliminary question (e.g., "Tell me about the kind of vehicle you are looking for") triggered by message 521. Message 522 may be a response from the user to that question (e.g., "Family Friendly"). The question-response sequence may repeat a plurality of times. The chatbot may present an open-ended questions (e.g., "Tell me about the kind of vehicle you are looking for") inquiring general characteristics desired by the user.

The chatbot may utilize user responses, such as response message 522 or a response to any other question, to select the initial candidate set of vehicles in accordance with step 201 of FIG. 2. For example, the chatbot may interpret the response 522 to represent one or more vehicle characteristics, and select the initial candidate set of vehicles based on the one or more vehicle characteristics represented by the response 522. The chatbot may be configured to interpret user responses by, for example, a trained machine learning model. For example, "Family Friendly" may be interpreted to include certain types of car body styles, while excluding other of car body styles. Accordingly, the initial candidate set of vehicles may be selected as vehicles that satisfy at least the one or more selected characteristics. FIG. 5B shows an example in which the chatbot outputs preliminary questions 551 and 552. The chatbot may interpret the responses 561 and 562, and select one or more vehicle characteristics according to its interpretation of the responses.

During the conversation session, the chatbot may determine to proceed to the repeatable preference identification process of steps 203 through 207 of FIG. 2. For example, a message 553 stating "let's try to narrow it down a little further" may be output to indicate a transition to the preference identification process. The transition may be triggered by a condition such as the exhaustion of preliminary questions to narrow down the base set of vehicles, or the completion of a response (e.g., response 522) to an open-ended question.

Question 540 shown in FIG. 5A and question 570 shown in FIG. 5B may be generated in accordance with the method of FIG. 2. Additionally, the chatbot interface may display user interaction elements 541, 542, 543, 544, 571, 572, 573, 574 permitting the user to respond in one of the four types of responses discussed above. In the example shown in FIG. 5B, the question 570 that is asked may correspond to a characteristic of a price range greater than 18040, and the responses labeled in interface elements 571 and 573 may correspond to "yes" and "no" responses, respectively, even though they are phrased in the format of "greater than" or "less than." As noted above, the question that is asked may be of any suitable form. For example, question 540 may instead be phrased as "are you looking for a new vehicle?" or "are you looking for a vehicle that is new?" For purposes of illustration, only one iteration of the user preference identification process is shown in FIGS. 5A and 5B.

While FIGS. 5A-5B illustrate the use of a graphical user interface for interactions between the computer system 110 and a user device (e.g., user device 121) for steps 205 and 206 of the method illustrated in FIG. 2, such interactions may utilize a voice user interface instead of, or in addition to, a graphical user interface. In general, in step 205, the computer system 110 may present the inquiry to the user of the user device 121 via any suitable method, involving any suitable user interface. The user input (indicating the user preference) in step 206 may also be input by the user using any suitable user interface. For example, the user device 121 may include a voice assistant configured to output an audio representation of the inquiry received by the user device 121. This audio representation may be, for example, an audio broadcast of the interrogatory question discussed in relation to step 205. Additionally, in step 206, the voice assistant may receive the user input in the form of speech. The user device 121 may then transmit the response to the computer system 110 based on the user input.

FIG. 6 illustrates an example of a vehicle listing interface 600 displaying a representation of a recommendation of one or more vehicles. The vehicle listing interface 600 may be displayed on a user device (e.g., user device 121) upon determining one or more recommended vehicles in according with step 208 of FIG. 2. The computer system 110 may transition the user from the interface shown in FIGS. 5A and 5B to the vehicle listing interface 600, or otherwise direct the user to the vehicle listing interface 600 by, for example, a hyperlink. In some examples, the user interface 600 may be a web page transmitted by the computer system 110 over network 130 for display on user device 121. The vehicle listing interface 600 may include a list of vehicles 620. The list of vehicles may be selected as vehicles that satisfy one or more characteristics specified on selection panel 640. Selection of vehicle characteristics from the selection panel 640 may be further indicated as filters 610.

According to some embodiments, upon completion of step 208 of FIG. 2, the computer system 110 may transmit the vehicle listing interface 600 (as, for example, a web page) to user device 121 such that the filters 610 are pre-set in accordance with the response(s) received from the user during the method of FIG. 2. That is, the user preferences indicated during the method of FIG. 2 may be converted into search filters of the vehicle listing interface 600, and the resulting list of vehicles 620 would include the one or more vehicle recommendations resulting from the method of FIG. 2.

For example, the filters 610 shown in FIG. 6 may be set by default if, across multiple iterations of the preference identification process (steps 203 through 207), the user submitted a "no" response to the "used" characteristic, a "yes" response to the characteristic of a price range of $20,000 to $40,000, and a "yes" response to the characteristic of a sedan body type.

According to the methodologies discussed above, an efficient series of questions may be generated for purposes of learning a user's preferences as to product characteristics. Such question-asking methodology may be incorporated into an interactive agent such as a chatbot, thereby improving the effectiveness of the chatbot in providing product recommendations.

In general, any process discussed in this disclosure that is understood to be computer-implementable, such as the processes shown in FIGS. 2-3, may be performed by one or more processors of a computer system, such as computer system 110 as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as computer system 110, may include one or more computing devices. If the one or more processors of the computer system is implemented as a plurality of processors, the plurality of processors may be included in a single computing device or distribute among a plurality of computing devices. If a computer system comprises a plurality of computing devices, the memory of the computer system may include the respective memory of each computing device of the plurality of computing devices.

Figure 7:
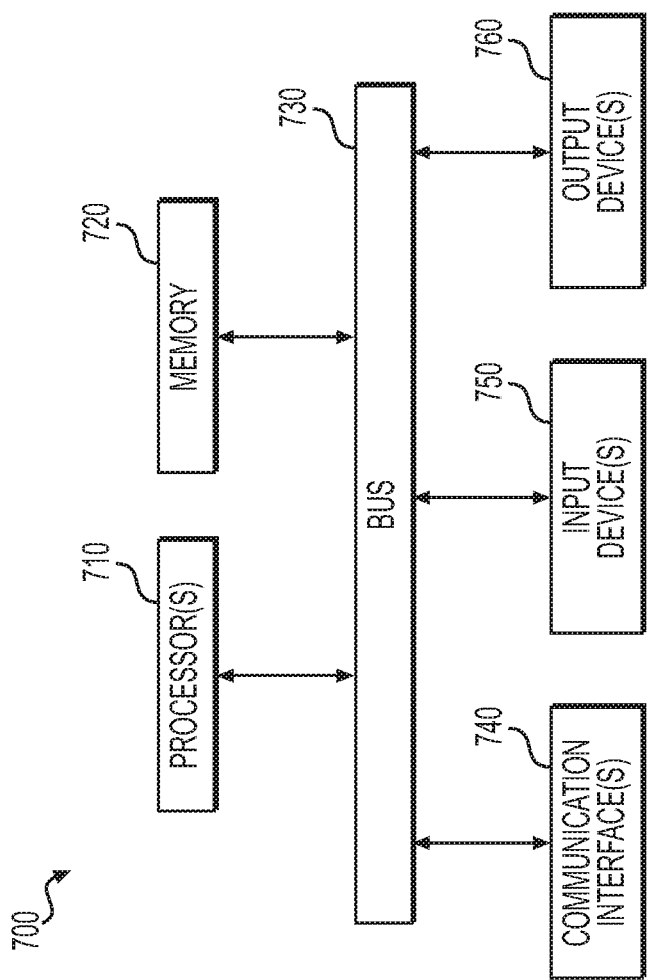
FIG. 7 depicts an example of a computing device, according to one or more embodiments.

FIG. 7 illustrates an example of a computing device 700 of a computer system. The computing device 700 may include processor(s) 710 (e.g., CPU, GPU, or other processing unit), a memory 720, and communication interface(s) 740 (e.g., a network interface) to communicate with other devices. Memory 720 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 720. The computing device 700 may, in some embodiments, further include input device(s) 750 (e.g., a keyboard, mouse, or touchscreen) and output device(s) 760 (e.g., a display, printer). The aforementioned elements of the computing device 700 may be connected to one another through a bus 730, which represents one or more busses. In some embodiments, the processor(s) 710 of the computing device 700 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for determining a product recommendation based on user interaction, the method being performed by a computer system and comprising:
    initiating a chatbot session enabling a user of a user device to communicate with a chatbot via a messaging interface provided on the user device, the chatbot being executed by the computer system;
    determining a location of the user;
    determining a candidate set of products, selected from products described in a database, that are in inventories within a specified geographical distance from the location of the user;
    determining a set of product characteristics represented in the candidate set of products, wherein:
        at least one product characteristic in the determined set of product characteristics is a range of values of a product attribute represented as a quantitative variable; and
        the range of values of the product attribute is based on a median value of the product attribute;
    determining a respective percentage of the candidate set possessed by each product characteristic in the set of product characteristics;
    selecting, from the set of product characteristics, a product characteristic based on the proximity of the respective percentage to 50% and one or more additional factors;
    causing the user device to present a chatbot natural language statement including an inquiry for a user preference regarding the selected product characteristic to the user via the messaging interface;
    receiving, from the user device during the chatbot session, a response including a user natural language statement indicating that the user preference regarding the selected product characteristic, the response being received from the user via the messaging interface;
    excluding products from the candidate set based on the indicated user preference to obtain a reduced candidate set;
    causing the user device to present, via the messaging interface, a hyperlink;
    receiving a user selection of the hyperlink; and
    upon receiving the user selection of the hyperlink, causing the user device to present a product listing interface on a webpage separate from the message interface, the product listing interface including a recommendation of one or more products from the reduced candidate set and one or more interactive search filters set by the computer system in accordance with the user preference.

2. The method of claim 1, wherein at least one product characteristic in the determined set of product characteristics is a value of a product attribute represented as a categorical variable.

3. The method of claim 1, wherein at least one product characteristic in the determined set of product characteristics is a range of values of a product attribute represented as a quantitative variable.

4. The method of claim 1, further comprising:
    causing the user device to present a second chatbot natural language statement including a second inquiry for a second user preference regarding the selected product characteristic to the user via the messaging interface;
    receiving, from the user device during the chatbot session, a second response including a user natural language statement indicating that the second user preference regarding the selected product characteristic, the second response being received from the user via the messaging interface; and
    excluding products from the candidate set based on the second user preference to obtain a second reduced candidate set.

5. The method of claim 4, further comprising causing the user device to present an updated product listing interface, the updated product listing interface including a recommendation of one or more products from the second reduced candidate.

6. The method of claim 1, wherein:
    the response indicates that the user preference is an exclusion of products not having the selected product characteristic, and
    in the excluding products from the candidate set, products that do not have the selected product characteristic are excluded from the candidate set to obtain the reduced candidate set.

7. The method of claim 1, wherein:
    the response indicates that the user preference is an exclusion of products having the selected product characteristic, and in the excluding products from the candidate set, products that have the selected product characteristic are excluded from the candidate set to obtain the reduced candidate set.

8. The method of claim 1, wherein the product is a vehicle, and wherein at least a portion of the product characteristics in the set of product characteristics includes a value for a vehicle attribute that is indicative of body style, exterior color, interior color, number of doors, vehicle condition, engine types, transmission type, fuel type, mileage, price, year, or fuel economy.

9. A computer system for determining product recommendations based on user interaction, the computer system comprising:
    a memory storing instructions; and
    one or more processors configured to execute the instructions to perform operations including:
        initiating a chatbot session enabling a user of a user device to communicate with a chatbot via a messaging interface provided on the user device, the chatbot being executed by the computer system;
        determining a location of the user;
        determining a candidate set of products, selected from products described in a database, that are in inventories within a specified geographical distance from the location of the user;

determining a set of product characteristics represented in a candidate set of products, wherein:
at least one product characteristic in the determined set of product characteristics is a range of values of a product attribute represented as a quantitative variable; and
the range of values of the product attribute is based on a median value of the product attribute;
performing one or more iterations of a preference identification process including:
determining a respective percentage of the candidate set possessed by each product characteristic in the set of product characteristics;
selecting, from the set of product characteristics, a product characteristic based on the proximity of the respective percentage to 50% and one or more additional factors;
causing the user device to present an inquiry for a user preference regarding the selected product characteristic to the user via the messaging interface;
receiving, from the user device during the chatbot session, a response including a natural language statement indicating that the user preference is an exclusion of products, the response being received from the user via the messaging interface; and
based on the response, reducing a quantity of products in the candidate set and/or adjusting the set of product characteristics;
causing the user device to present, via the messaging interface, a hyperlink;
receiving a user selection of the hyperlink; and
upon receiving the user selection of the hyperlink, causing the user device to present a product listing interface on a webpage separate from the message interface, the product listing interface including a recommendation of one or more products from the reduced candidate set and one or more interactive search filters set by the computer system in accordance with at least one user preference received in at least one of the one or more iterations of the preference identification process.

10. The computer system of claim 9, wherein, in the determining the respective percentage of the candidate set in at least one of the one or more iterations of the preference identification process,
at least one product characteristic in the set of product characteristics is a value of a product attribute represented as a categorical variable.

11. The computer system of claim 9, further comprising:
causing the user device to present a second chatbot natural language statement including a second inquiry for a second user preference regarding the selected product characteristic to the user via the messaging interface;
receiving, from the user device during the chatbot session, a second response including a user natural language statement indicating that the second user preference regarding the selected product characteristic, the second response being received from the user via the messaging interface; and
excluding products from the candidate set based on the second user preference to obtain a second reduced candidate set.

12. The computer system of claim 11, further comprising causing the user device to present an updated product listing interface, the updated product listing interface including a recommendation of one or more products from the second reduced candidate set.

13. The computer system of claim 9, wherein the inquiry for the user preference regarding the selected product characteristic comprises an open-ended question.

14. The computer system of claim 9, wherein in at least one iteration of the one or more of iterations of the preference identification process,
the response indicates that the user preference is an exclusion of products having the selected product characteristic or of products not having the selected product characteristic, and
the reducing the quantity of products in the candidate set and/or adjusting the set of product characteristics includes excluding products from the candidate set, based on the exclusion indicated by the response.

15. The computer system of claim 9, wherein:
the one or more iterations of the preference identification process is a plurality of iterations of the preference identification process, and
a different product characteristic is selected in each of the plurality of iterations of the preference identification process.

16. The computer system of claim 15, wherein in at least one iteration of the plurality of iterations of the preference identification process,
the response indicates that the user preference is non-exclusive inclusion of products having the selected product characteristic, and
the reducing the quantity of products in the candidate set and/or adjusting the set of product characteristics includes replacing the selected characteristics with a new characteristic from the set of product characteristics, the new characteristic being an inclusive disjunction of the selected characteristic with one or more characteristics in the set of product characteristics other than the selected characteristic.

17. The computer system of claim 15, wherein in at least one iteration of the plurality of iterations of the preference identification process,
the response indicates that the user preference is that the selected product characteristic is not determinative, and
the reducing the quantity of products in the candidate set and/or adjusting the set of product characteristics includes removing the selected product characteristic from the set of product characteristics.

18. A computer system for implementing an artificial-intelligence interactive agent for determining product recommendations based on user interaction, the computer system comprising:
a memory storing instructions and a database of products; and
one or more processors configured to execute the instructions to perform operations including:
initiating a chatbot session enabling a user of a user device to communicate with a chatbot via a messaging interface provided on the user device, the chatbot being executed by the computer system;
determining a location of the user;
causing the user device to present a request to indicate a type of product desired by a user of the user device;
receiving, from the user device via the messaging interface during the chatbot session, an indication of the type of product desired by the user;
determining a candidate set of products, selected from products described in the database, based on the type of product desired and that are in inventories within a specified geographical distance from the location of the user; and performing a plurality of iterations of a preference identification process including:
   determining a set of product characteristics represented in the candidate set of products, wherein:
      at least one product characteristic in the determined set of product characteristics is a range of values of a product attribute represented as a quantitative variable; and
      the range of values of the product attribute is based on a median value of the product attribute;
   determining a respective percentage of the candidate set possessed by each product characteristic in a set of product characteristics,
   selecting, from the set of product characteristics, a product characteristic based on the proximity of the respective percentage to 50% and one or more additional factors,
   causing the user device to present an inquiry for a user preference regarding the selected product characteristic;
   receiving, from the user device via the messaging interface, a response to the inquiry including a natural language statement indicating that the user preference is an exclusion of products, the response being received from the user via the messaging interface; and
   based on the response to the inquiry, reducing a quantity of products in the candidate set and/or adjusting the set of product characteristics, wherein the respective selected characteristic is different for each of the plurality of iterations of the preference identification process, and at least one of the plurality of iterations reduces the quantity of products in the candidate set;
   causing the user device to present, via the messaging interface, a hyperlink;
   receiving a user selection of the hyperlink; and
   upon receiving the user selection of the hyperlink, causing the user device to present webpage including a product listing interface separate from the messaging interface, the product listing interface including a list of one or more products from the reduced candidate set and one or more interactive search filters set by the computer system in accordance with at least one user preference received in at least one of the one or more iterations of the preference identification process.

19. The method of claim 3, wherein the quantitative variable is a continuous quantitative variable.

20. The computer system of claim 11, wherein the quantitative variable is a continuous quantitative variable.

\* \* \* \* \*